United States Patent

Banks

[19]

[11] Patent Number: 5,988,290

[45] Date of Patent: Nov. 23, 1999

[54] BI-DIRECTIONALLY BIASED VERTICAL CULTIVATING MACHINE

[75] Inventor: John Stanley Banks, Templestowe, Australia

[73] Assignee: Deere & Company, Moline, Ill.

[21] Appl. No.: 09/200,341

[22] Filed: Nov. 25, 1998

Related U.S. Application Data

[63] Continuation of application No. 08/598,422, Feb. 8, 1996, abandoned.

[30] Foreign Application Priority Data

Nov. 8, 1995 [AU] Australia .................................. 6426

[51] Int. Cl.⁶ ................................................ A01B 45/02
[52] U.S. Cl. ............................ 172/21; 172/42; 172/95; 172/101; 172/125
[58] Field of Search .......................... 172/22, 75, 97, 172/125, 21, 84, 88, 95, 93, 101, 42

[56] References Cited

U.S. PATENT DOCUMENTS

| | | | |
|---|---|---|---|
| 2,056,337 | 10/1936 | Archibald | 97/36 |
| 2,236,562 | 4/1941 | Brandes | 97/44 |
| 2,638,831 | 5/1953 | Ferguson et al. | 97/44 |
| 3,022,834 | 2/1962 | Ruka et al. | 172/21 |
| 3,136,274 | 6/1964 | Townsend | 111/6 |
| 3,204,703 | 9/1965 | Hansen | 172/21 |
| 4,236,582 | 12/1980 | Hastings | 172/22 |
| 4,632,189 | 12/1986 | Rizzo | 172/22 |
| 4,753,298 | 6/1988 | Hansen et al. | 172/22 |
| 4,819,734 | 4/1989 | Classen | 172/22 |
| 4,867,244 | 9/1989 | Cozine et al. | 172/22 |
| 4,884,637 | 12/1989 | Rohleder | 172/22 |
| 5,207,278 | 5/1993 | Hatlen | 172/22 |

FOREIGN PATENT DOCUMENTS

| | | |
|---|---|---|
| 101106 | 6/1937 | Australia . |
| 143451 | 9/1951 | Australia . |
| 58384 | 4/1977 | Australia . |
| 73500 | 12/1987 | Australia . |
| 41609 | 3/1990 | Australia . |
| 0195103 | 9/1986 | European Pat. Off. . |
| 497277 | 12/1938 | United Kingdom . |
| 918914 | 2/1963 | United Kingdom . |

OTHER PUBLICATIONS

Sketch of Aerating Machine Linkage Commercially Available More Than One Year Prior To Filing The Present Application.
Affadavit Of Mark E. Lamb.
Declalration of Mark E. Lamb.
Sketch of TM1500 aerating machine commercially available more than one year prior to filing the present application.

*Primary Examiner*—Christopher J. Novosad

[57] ABSTRACT

A cultivating machine has a structure arranged to be mounted on ground engaging wheels for movement in a line of travel. At least one tool support is mounted on the structure so as to be moveable with respect thereto, and a drive is also mounted on the structure for driving the tool support. The tool support has a body having two end portions, the first end portion being driven in use in a circular path by the drive. The second end portion is connected to the structure through a link arm pivotably attached to the tool support and to a swing arm, which in turn is pivotably attached to the structure, the swing arm being biased toward a median position and the second end of the tool support carrying at least one cultivating tool.

34 Claims, 3 Drawing Sheets

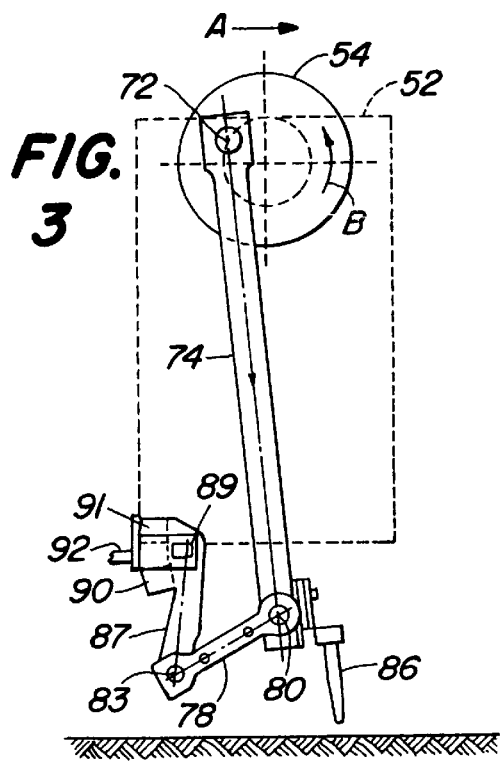
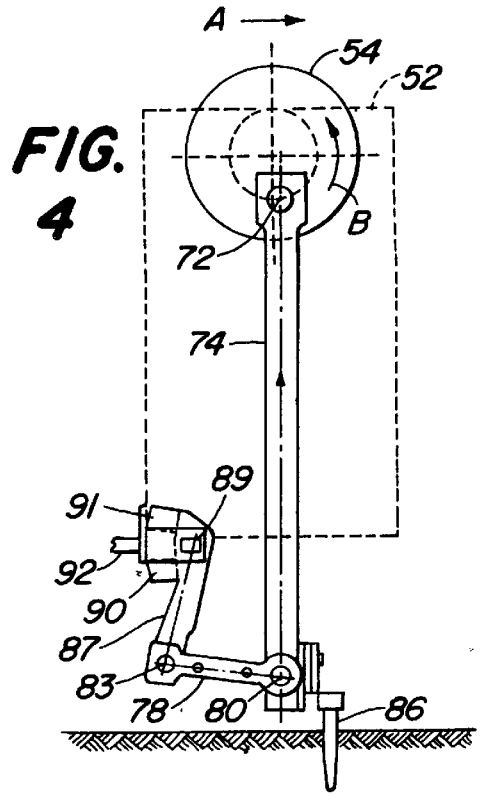
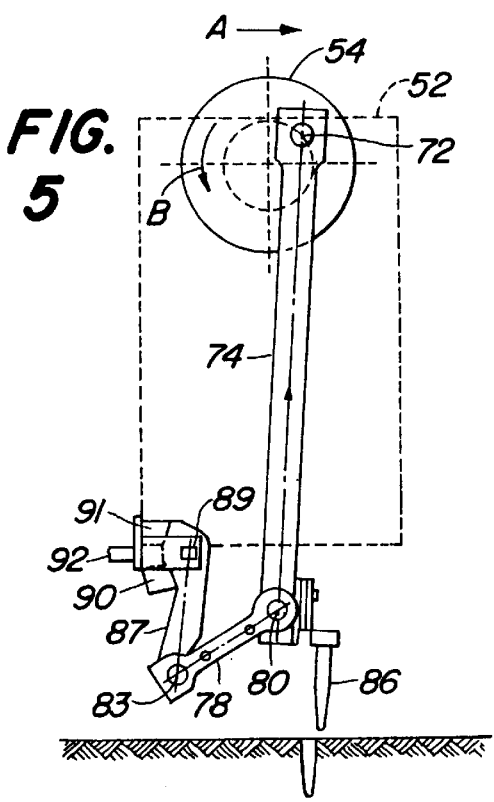
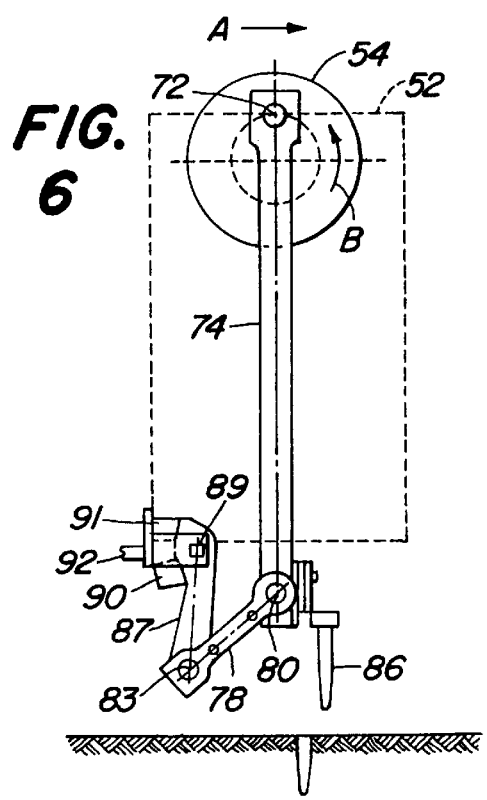

BI-DIRECTIONALLY BIASED VERTICAL CULTIVATING MACHINE

This is a continuation application of application Ser. No. 08/598,422, filed Feb. 8, 1996, now abandoned.

BACKGROUND OF THE INVENTION

1. Field of the Invention

This invention relates to a cultivating machine and more particularly, although not exclusively to a cultivating machine of the type used to cultivate turf such as used for golf courses, sports arenas, bowling greens and the like. More specifically, the invention is concerned with a cultivating machine of the type described in Australian Patent Application No. 73500/87.

2. Description of the Prior Art

The specification of the aforementioned Patent Application describes a machine having a wheeled frame on which is mounted a tool support means. The tool support means is power driven and carries a cultivating tool, and the manner in which the support means is driven causes the cultivating tool to reciprocate in a substantially vertical plane. When the machine is moved along the ground in use the cultivating tool is caused to repeatedly penetrate the ground thereby aerating and improving the condition of the ground. The specification of Patent Application No. 73500/87 is included herein by way of reference.

It will be appreciated that repeated penetration of the ground by the cultivating tool will place a substantial strain on the components and linkages which comprise the machine. This is particularly so where the machine is used over hard ground or where the cultivating tool strikes a sub-surface rock or the like. Machines manufactured in accordance with the aforementioned specification have in operational conditions had components breaking during use which causes delay and can be costly.

A similar type of machine is described in Australian Patent Application 41609/89. This machine is less susceptible to damage during use, but does not make a fully satisfactory hole in the ground. For general purposes, the edges of a hole made by a cultivating machine need not be particularly even; the length of the grass or turf is such that a hole with rough edges or a slightly larger hole than the hole making tool is unimportant. However, on golfing or bowling greens and the like where the vegetation is short, a hole with rough edges or too large a hole can cause spot erosion, resulting in an undesirable dimple in the ground surface. This effect is aggravated when the forward movement of a cultivator is faster than the speed of the hole making tool over the ground, causing the hole making tool to "rake" the ground surface. Since some cultivators are powered by a link to a prime mover, such as a tractor, it is very hard to synchronise the speed of the hole making tool with the speed of the tractor, given the different gear ratios between the driving wheels of the tractor and the power link. This tends to aggravate any problem in forming neat holes.

To ensure as neat a hole as possible, it is important that the tines of the hole making tool remain as near to vertical as possible whilst they are in contact with the ground. One means of achieving this is depicted in Australian Patent Application 41609/89 wherein a hole making tool is attached to one end of support means, the other end of the support means being driven in a circular motion by drive means. The support means is kept substantially vertical by a rigid link near the hole making tool, wherein the link is pivotally connected to both the support means and the frame of the cultivating machine. As previously mentioned, this type of machine was not entirely satisfactory for applications where a neat hole is required.

A similar type of machine is also depicted in U.S. Pat. Nos. 4,753,298 and 4,867,244. In these machines, a pivotable rigid link is connected between the support means and a swing arm pivotably connected to the frame of the machine, allowing for greater variation in the forward speed of the cultivator over the ground compared with the forward speed of the hole making tool. In these machines the swing arms are linked in pairs, either by further links to a rocker shaft or by intermeshing teeth adjacent the pivot of each swing arm with the machine frame, so that adjacent pairs of hole making tools are linked to reciprocate forward and back as alternate tools contact the ground. Besides being mechanically more complex and therefore more expensive to produce and more liable to break downs, these machines also create a less than satisfactory hole.

The present invention aims to alleviate or overcome one or more of the aforementioned disadvantages.

SUMMARY OF THE INVENTION

According to the invention there is provided a mobile turf cultivating machine comprising a structure arranged to be mounted on ground engaging wheels for movement in a line of travel, at least one tool support means mounted on the structure so as to be moveable with respect thereto, and drive means mounted on said structure for driving said tool support means, said tool support means comprising a body having two end portions, the first end portion being driven in use in a circular path by said drive means, the second end portion being connected to said structure through a link arm pivotably attached to the tool support means and to a swing arm, which in turn is pivotably attached to the structure, the swing arm being bi-directionally biased toward a median position by biasing means, said other end of said tool support means carrying at least one cultivating tool.

DETAILED DESCRIPTION OF THE INVENTION

The tool support means may be of any of a wide variety of forms. In one convenient arrangement, the support means is an elongate member such as a rod or a post (herein referred to as a post member) and is preferably formed from tubular material. Such post member may be disposed substantially vertically and this is preferred. Also, while a single such post member can be used, the tool cultivating machine preferably comprises at least two laterally spaced post members. Where two or more post members are provided, they or at least successive ones thereof preferably are out of phase by between 170° and 190° in movement in their circular path. For two post members, they are more preferably 180° out of phase.

The link arm is pivotably attached to the support means and to the swing arm so that it may pivot freely in a vertical plane relative to the support means and the swing arm. Although the swing arm can pivot in a vertical plane relative to the structure, the biasing means act to return the swing arm to the median position in each range of movement.

Biasing means according to the present invention preferably comprises resilient buffer members which are compressed between a stop means and mounting means by movement of the swing arm. Australian Patent Application 41609/89 discloses the use of a leaf spring to bias the link arm to a right angle position relative to a secondary link part. However, the present inventors have found such biasing means to be unsatisfactory due to the torsional forces applied to such biasing means. In use, such torsional biasing means quickly fail due to the extent of movement and large number of repetitive movements required. By using biasing means which are compressed, the anticipated life of the resilient buffers is considerably in excess of the biasing means of prior art methods. This is believed to be partly due to the nature of the forces involved and also to the fact that the resilient buffers can be supported by a rigid framework.

Preferably, the swing arm is provided with a stop means projecting from the swing arm adjacent to its axis of rotation relative to the structure. The stop means preferably project above the swing arm. On either side of the stop means, are resilient buffer means which resist movement of the stop means relative to the structure and act to bias the swing arm to the median position. Alternatively, the buffer means may be mounted on the swing arm to engage a stop means mounted on the structure, thereby biasing the swing arm to the median position.

The buffer means may be formed from many suitably resilient materials, for example, natural or synthetic rubbers and the like. Preferably, the buffer means are cylindrical in cross section and are positioned in mounting means so that the stop means abuts the circumference of the cylinder. As force is applied to the buffers, they assume a different shape, that is the circular cross-section becomes elliptical and also the cylinder elongates. It is preferable that the tension on these buffers is greater on the side affecting forward movement of the swing arm and lesser on the side affecting rearward movement of the swing arm. One method of achieving this is to have a greater volume of rubber, or rubber of greater hardness on the side biasing the swing arm to a forward position and to have buffers of lesser volume or of a more pliable composition on the side biasing the swing arm to a rearward position. This form of buffer provides superior wear characteristics for the buffer means. By positioning the stop means and buffer means above the swing arm, dirt and grit raised by the hole making tool is less likely to accumulate in and around the buffers, again improving the wear characteristics of the buffers.

The drive means may include a suitable motor, such as a petrol, or an electric or battery, driven motor. However, in an alternative arrangement, the machine may be moved by a prime mover such as a tractor, with power to its drive means being derived from a motor of the prime mover. In each case, the drive means may include a crank means rotatable on a transverse axis by a drive connection between it and the motor. In one convenient arrangement, a flywheel in a plane parallel to the path of movement of the tool support means is rotatable by a drive coupling, such as a drive belt, between it and an output member of the motor. Preferably the flywheel rotates in the opposite direction to the ground engaging wheels. In such arrangement, a stub shaft mounted on or journalled in a major face, but radially offset from the axis of rotation, of the flywheel may comprise or form part of the crank means. Such stub shaft respectively may be journalled in or mounted on the tool support means. A similar such shaft on a face of a slave wheel can be journalled in or mounted on a second support means where two of the latter are provided.

It is preferred that the axis of the circular path is horizontally disposed and is at right angles to the line of travel. The link arm is preferably movable in a plane which is parallel to the line of travel, that is to say the axes of the pivotal connections between the rigid link and the tool support means and the structures are both substantially at right angles to that line.

The cultivating tool may be rigidly fixed to said other end of said tool support means. Where the cultivating tool is of elongate form the longitudinal axis of the tool may be parallel to the line joining the two ends of the support means. Alternatively, the cultivating tool may be connected to the other end of the tool support means through parallelogram link means in a manner as described in Australian Patent Application No. 73500/87.

DRAWINGS

Embodiments of the invention are described in detail in the following passages of the specification which refer to the accompanying drawings. The drawings, however, are merely illustrative of how the invention might be put into effect, so that the specific form and arrangement of the various features as shown is not to be understood as limiting on the invention.

In the drawings:

FIGS. 3 to 6 show diagrammatically on an enlarged scale operating components of the apparatus at various stages during its travel;

Figure 1:
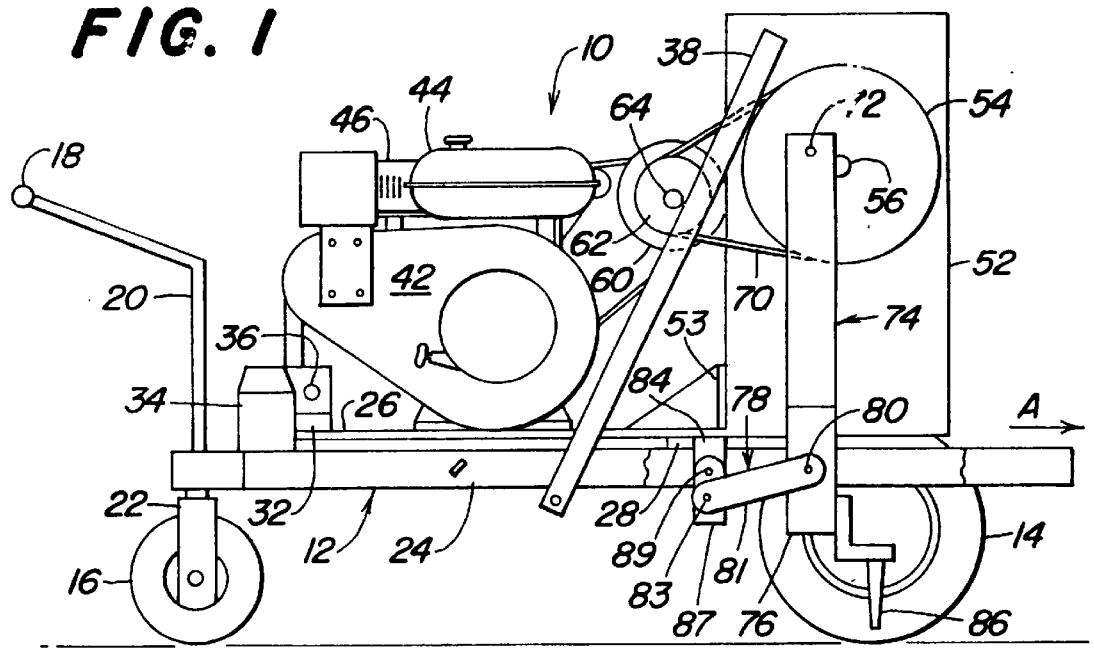
FIG. 1 shows a machine according to the invention in a first side elevation.

In the drawings, there is shown a cultivating machine 10, having a main structure 12 mounted on a pair of forward wheels 14, a single rear jockey wheel 16. The machine 10 is able to be steered during forward travel (in the direction of arrow A) by turning wheel 16 using control handle 18. The latter has a post 20 journalled in structure 12 and terminating at its lower end in a yoke 22 in which wheel 16 is mounted.

Figure 2:
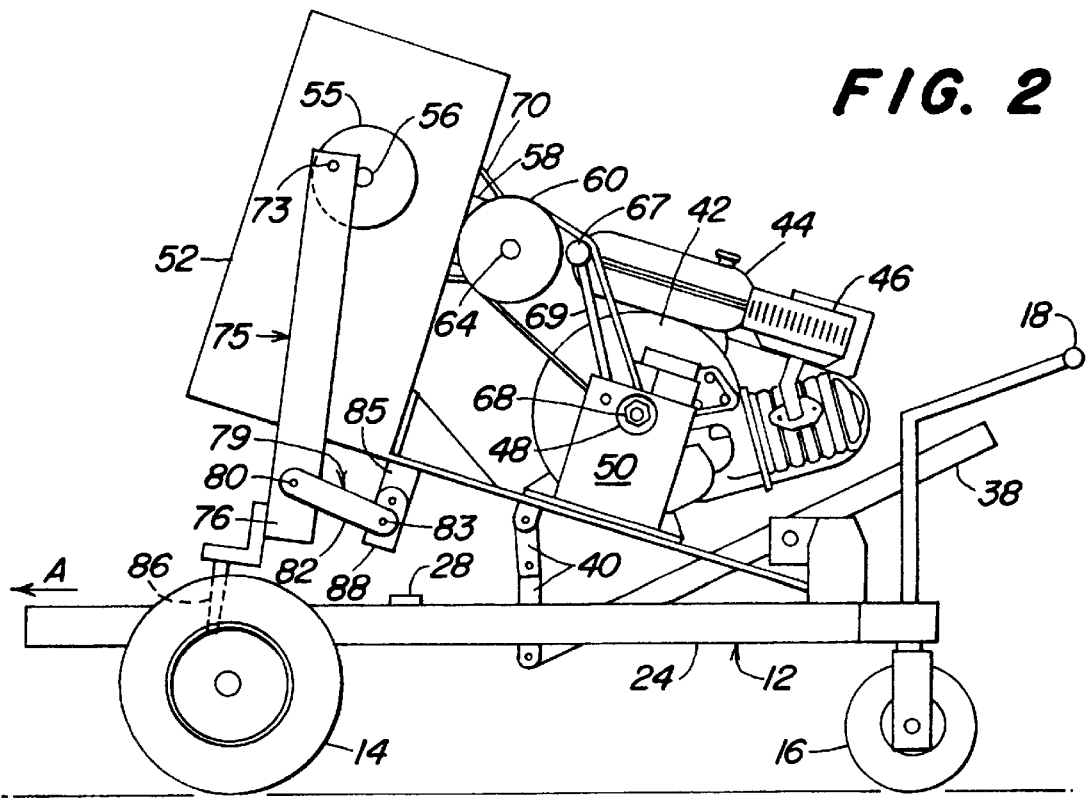
FIG. 2 shows the machine in the opposite side elevation to that shown in FIG. 1, but with the apparatus in a non-operating condition.

Structure 12 includes a peripheral frame 24 of hollow box section. Structure 12 also includes a platform 26 which, with the apparatus ready for use as shown in FIG. 1, rests on blocks 28 fixed on frame 24. Platform 26 has laterally opposed plates 32 at its rear end which are pivotally connected to similar plates 34 of platform 26 by transverse shaft 36. Thus, the forward end of platform 26 is able to be raised from its in use position shown in FIG. 1 to a position as shown in FIG. 2; this facilitating travel of the apparatus when not required to perform a cultivating operation. Platform 26 is able to be moved between its positions by a manual pivoting of lever 38 and link 40 coupling lever 38 to platform 26.

The mechanical pivoting mechanism comprising lever 38 and links 40 may be replaced by alternative lifting means for lifting platform 26 relative to structure 12. In this regard it is specifically envisaged that some form of hydraulic lifting means may be provided (not shown). That hydraulic lifting mechanism may comprise a small hydraulic piston and cylinder assembly interconnected between the structure 12 and platform 26 and arranged to pivot the platform about shaft 36. The machine may carry a fluid reservoir and fluid pump which may be driven by motor 42 described herebelow. One advantage of providing a hydraulic or other power driven lifting means is that automation of the lifting and lowering operation is thereby simplified.

On the rear end of platform 26, and to one side of the machine 10, there is mounted a petrol motor 42 which receives fuel from tank 44 and air through air filter 46. Motor 42 has a laterally extending output shaft 48 which is journalled in upright plate 50 mounted on the opposite side of the apparatus to motor 42.

At the forward end of platform 26, there is an upright plate 52, supported by transverse mounting plate 53 and having its width dimension extending along the centre line of apparatus 10. Mounted on one side of plate 52, there is a flywheel 54 rotatable on transverse shaft 56 journalled in plate 52. Projecting rearwardly of plate 52, there is a bracket 58, with a respective pulley 60, 62 mounted on each side of bracket 58 but rotatable in unison with common shaft 64 journalled in bracket 58. Flywheel 54 is rotatable by a driving connection with motor 42. A first drive belt 66 passes around pulley 68 on and rotatable with shaft 48, and around pulley 60, while a second such belt 70 passes around pulley 62 and flywheel 54. Belts 66, 70 are suitably tensioned by guide wheel 67 carried on arm 69 and bearing against belt 66; arm 69 being biased to provide suitable belt tension by resilient means not shown.

On the outer face of flywheel 54, there is an integral stub shaft 72. Additionally, on the side of plate 52 remove from flywheel 54 there is a slave wheel 55 rotatable with flywheel 54 on shaft 56. Wheel 55 also has a stub shaft 73, with shaft 73 being radially spaced from shaft 56 by the same distance as shaft 72. Shafts 72, 73 are circumferentially spaced by 180°.

Each of shafts 72, 73 is journalled in the upper end of a respective thin post member 74, 75 each of similar form.

A link arm 78, 79 pivotally connects the lower end 76 of each post member 74, 75 to respective swing arms 87, 88; which are pivotably connected to platform 26. In the arrangement shown lower end 76 of each post member carries a short stub shaft 80 which projects a short distance beyond the post member. Each link 78, 79 is journalled to the shafts 80. The opposite end of each link 78, 79 is pivotably attached by pivot 83 to respective one of two swing arms 87 and 88 which in turn are pivotably connected to downwardly projecting mounting brackets 84, 85 which are fixed below the platform 26. Swing arms 87 and 88 are biased toward a median position by biasing means (not shown in FIGS. 1 and 2). The arrangement is such that the post members are free to move relative to the platform 26 in a vertical plane which is parallel to the line of travel of the machine whilst remaining connected to the platform 26 through links 78, 79 and swing arms 87 and 88. Thus, as flywheel 54 is rotated, members 74, 75 are driven bodily in a circular path but are maintained in a substantially vertical orientation.

With this arrangement, the tine path is kept very close to vertical for that portion of the cycle, when the tine is below the ground surface. As the tine emerges from the ground, the post member 74 swings slightly away from vertical orientation causing the tine to move in a forward direction to adopt a position for re-entry into the ground. At this part of the cycle, post member 74 assumes its vertical orientation again.

The lower end 76 of each post member 74, 75 carries a set of tines 86. These tines 86 are of elongate form and are parallel to the post members 74, 75. The tines 86 are mounted somewhat forward of the lower end 76 of the post members and the arrangement is such that when the platform 26 is in its lowered position, as shown in FIG. 1, with the flywheel 54 at the rotational position when the shaft 72 is at its lowermost point, the tips of the tines 86 are below the lowermost point of the forward wheels. Individual tines are preferably fixed to an angle bracket secured to the respective lower end 76 of post member 74, 75.

FIGS. 3 to 6 show plate 52, flywheel 54, post member 74 and link arm 78 connected to swing arm 87 as shown in FIG. 1. The direction of movement of the machine is indicated by arrows A. Also, the flywheel 54 is driven by motor 42 so as to rotate in the direction of arrow B. During the rotation of the flywheel 54 the post member 74 is constrained to move up and down in a substantially vertical orientation by the stub axle 72, link means 78 and swing arm 87. The amplitude of the up and down movement is defined by the distance which the stub axle 72 is offset from the axis of rotation of the flywheel 54. The combined effect of the movement of the machine and the flywheel 54 as indicated by arrows A and B respectively will be that the tines 86 travel in a substantially cycloidal path the precise form of which is defined by the relative speeds of the machine and flywheel. It will be appreciated that there is extremely slight back and forth tilting of the tines whilst they are in the ground due to the manner in which the post member is driven and connected to the platform 26. It will be noted that during up and down movement of the post member 74 the link 78 pivots about axle 83 to permit such up and down movement of the post member 74.

Similarly, restricted pivoting of the swing arm on pivot 89 assists in maintaining the substantially vertical orientation of the post member 74. Pivoting of the swing arm 87 is restricted by the action of resilient buffers 90, 91 mounted on swing arm 87 adjacent to pivot 89 on stop means 92, which engages buffers 91, 92 and retards further movement of the swing arm, maintaining the swing arm in a median position.

FIG. 3 depicts the position of the post member 74 and tines 86 just prior to the tines entering the ground. FIG. 4 depicts the position when the tines are at the lowermost position in their path of travel just prior to being lifted out of the ground. FIG. 5 depicts the position in which the tines have been lifted out of the ground and FIG. 6 depicts the position in which the tines are at their highest point above the ground. It will be noted that in FIGS. 3 and 5 the tines 86 have been tilted slightly. In FIG. 5 the upper ends of the tines are slightly forward of the lower ends. This orientation facilities easier removal of the tines from the ground where the machine is travelling forward in the direction of arrow A. In FIG. 3, the tines 86 are tilted so as to facilitate insertion of the tines into the ground.

During each cycle, post member 75 and its corresponding link arm 79 and swing arm 88 are performing the same cycle, but about 180° out of phase. The effect of this will be that when one set of tines 86 at the lower end of post 74 are in the raised position the other set of tines 86 at the lower end of post 75 will be nearly at their lowermost position.

Suitable drive means may be provided to the wheels. In one arrangement, shaft 48 is provided with a pulley or sprocket outside plate 50, with a belt or chain, respectively, passing therearound and around a pulley or sprocket rotatable with the associated one of wheels 14. In an alternative arrangement, a hydraulic fluid pump driven by shaft 48 can provide pressurized hydraulic fluid for a hydraulic motor, or a respective hydraulic motor, operable to drive one or more of the ground-engaging wheels; the output of the pump being regulated, if required, by a flow control valve. Such drive from motor 42 can also be used in transporting the apparatus from one location to another, with plate 26 raised as in FIG. 2.

Alternatively, it is possible to mount the machine to a tractor or like motive power vehicle. The tractor (not shown) will have a drive arrangement which may be coupled to the tractor motor through a gearbox (not shown), that drive arrangement terminating in a rotatable shaft power outlet. This arrangement is standard on many tractors and it will not be necessary to describe the power outlet in more detail herein. The power outlet will be coupled to the flywheel 54 by any suitable drive connection. This may include a driven sprocket wheel which drives the flywheel 54 through an endless chain.

Hole spacing is dependant upon the relationship between tractor wheel speed and power outlet speed. A problem may occur where the tractor drive speed and the speed with which the tines move relative the ground are not exactly the same. This may occur, for example, where the tractor speed is high but the power output speed is low in which case the tines will be urged to move laterally through the ground in a raking action rather than vertically into and out of the ground in a coring action. Generally the tractor speed can be varied by selecting a different gear, as can the power output speed, but often no compatible ratios of speeds can be found and the flywheel as a consequence either rotates too fast or too slow for the associated vehicle speed. Since there are a large number of suitable vehicles to which a coring machine of this type can be fitted, and many of these vehicles have different gear ratios it is not simply a matter of altering the rotational speed of the flywheel to solve this problem. Clearly, the flywheel speed can be matched to a particular vehicle but it is preferable that the coring machine is of standard construction and can be fitted to any suitable vehicle.

As shown in FIGS. 3 to 6, the use of the swing arm 87 can allow for variations between the movement rate of the tines 86 and a towing vehicle. By pivoting at pivot 89, swing arm 87 can move pivot 83 forward or backward during the movement of the post member 74 so that the optimum angle of the tines 86 to the ground is maintained.

Thus, during use, the tractor will move across the ground at a speed, say 'x'. Likewise during use the tines will tend to move relative to the machine at a speed, say 'y'. The swing arm 87, 88 will accommodate the difference between speeds 'x' and 'y'.

In FIG. 3, as tine 86 approaches contact with the ground, swing arm 87 pivots on pivot 89 so that buffer 91 is compressed by stop means 92 (see FIG. 4). After the tine enters the ground, the energy stored in buffer 91 is released causing swing arm 87 to move in a rearward direction (opposite to the direction of the machine). As the lower end of the stroke is approached, swing arm 87 continues to pivot rearwards causing buffer 90 to be compressed against stop means 92. Continued rotation of flywheel 54 causes the tine 86 to emerge from the ground. At this part of the cycle, post member 74 moves from the vertical position and stub axle 72 rotates to the position shown in FIG. 3, causing post member 74 to swing to an angle causing tine 86 to adopt a position for re-entry into the ground at a distance forward from the previous hole.

It will be appreciated that the number and arrangement of tines or cultivating tools on the or each connecting member can be varied, as required. Also, the number of post members comprising the support means and provided in laterally spaced relationship can be increased, as required. Moreover, a fore and aft spaced arrangement, comprising two or more arrays of laterally spaced post members can be used in tandem, if required. Additionally, the overall diameter of the circular path in which the support means is moved can be varied, as required; with corresponding variation in the length of the link means, the cultivating tools and the depth of penetration of the latter.

Figure 7:
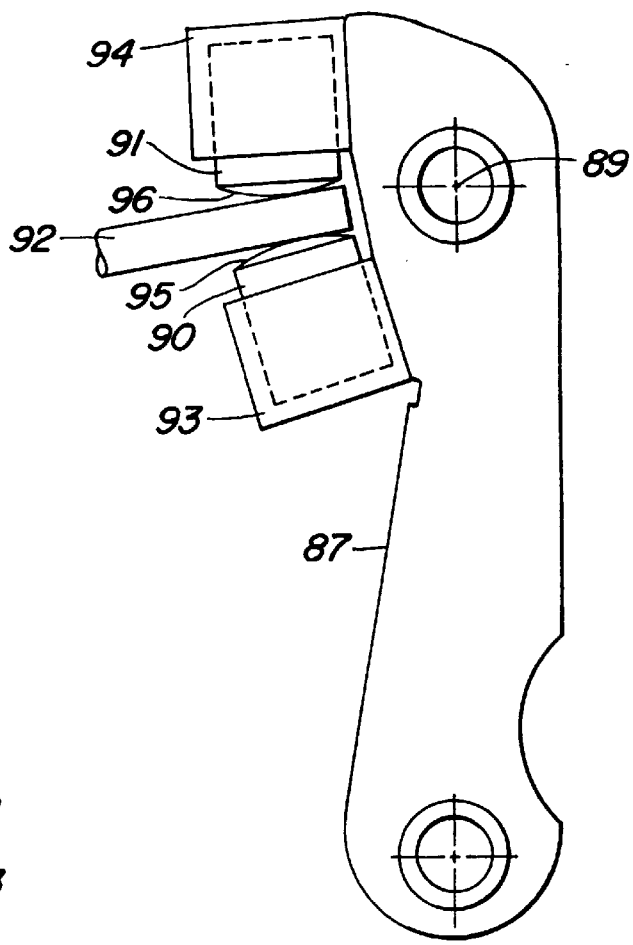
FIG. 7 shows the biasing arrangement depicted in FIGS. 3 to 6.

FIG. 7 shows an enlargement of the biasing arrangement depicted in FIGS. 3 to 6. Swing arm 87 is provided with two resilient buffers 90, 91, supported in mounting means 93, 94 attached to the swing arm 87. The buffers 90, 91 preferably have domed faces 95, 96 which are mutually opposing and which closely surround stop means 92. Rotation of swing arm 87 about pivot 89 causes one of buffer means 90, 91 to be deformed against stop means 92. As the deformed buffer means resiliently returns to its original shape, swing arm 87 is moved back to a median position.

Figure 8:
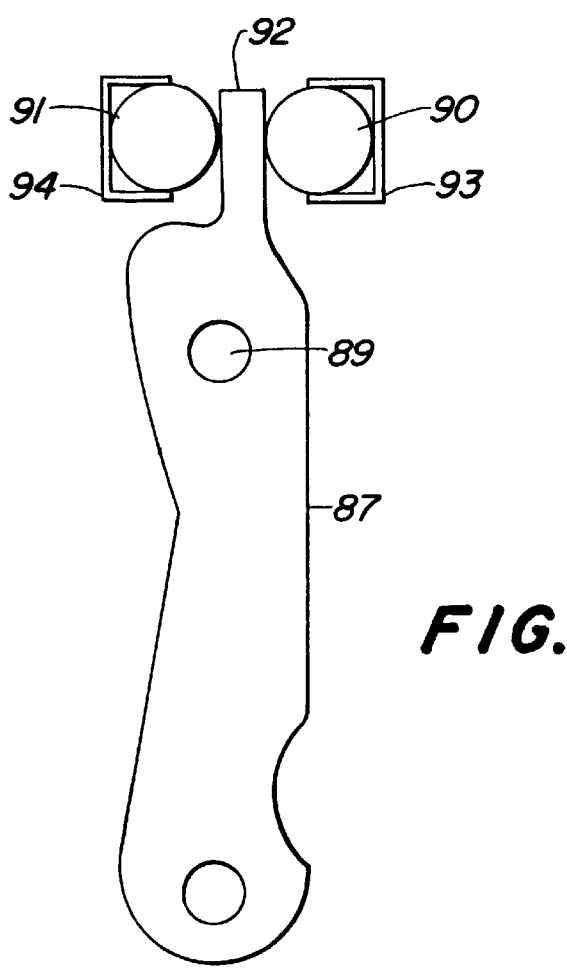
FIG. 8 shows yet another biasing arrangement.

FIG. 8 depicts an alternative embodiment in which stop means 92 is attached to swing arm 87. Rotation of swing arm 87 about pivot 89 causes stop means 92 to deform one of buffers 90, 91 depending upon the direction of rotation. Buffers 90, 91 are formed from cylindrical resilient bodies, supported in mounting means 93, 94 so as to present a circumferential face to stop means 92. The stop means 92 and buffers 90, 91 are positioned vertically above swing arm 87 to reduce the retention of dirt and grit adjacent the buffers 90, 91.

It is to be understood that various other alterations, modifications and/or additions may be introduced into the constructions and arrangements of parts previously described without departing from the spirit or ambit of the invention as defined by the appended claims

I claim:

1. A cultivating machine comprising a structure arranged to be mounted on ground engaging wheels for movement in a line of travel, at least one tool support member mounted on the structure so as to be moveable with respect thereto, a drive mechanism operatively mounted between the structure and the at least one tool support member, the at least one tool support member comprising a body having first and second end portions, the first end portion being driven in use in a generally circular path by the drive mechanism and the second end portion being connected to the structure through a link arm pivotably attached to the at least one tool support member and to a swing arm, which in turn is pivotably attached to the structure, the swing arm being bi-directionally biased toward a median position by a biasing mechanism comprising resilient buffer members which are in contact with a stop member when the swing arm is in the median position and compressible by the stop member by movement of the swing arm from the median position whereby the buffer members apply a biasing force to urge the swing arm to the median position, the second end portion of the at least one tool support member carrying at least one cultivating tool.

2. The cultivating machine of claim 1, wherein a plurality of tool support members and biasing mechanisms are provided, and the tool support members are each bi-directionally biased toward a median position by a respective biasing mechanism.

3. The cultivating machine of claim 2, wherein the swing arm is connected with the structure for pivotal motion about an axis having a fixed position with respect to the structure.

4. The cultivating machine of claim 3, wherein the pivotal connection between the swing arm and the structure, and the pivotal connection between the swing arm and the link arm define axes which extend parallel to each other and to an axis about which the first end portion of the at least one tool support member is driven in a circular path.

5. The cultivating machine of claim 2, wherein the pivotal connection between the swing arm and the structure, and the pivotal connection between the swing arm and the link arm define axes which extend parallel to each other and to an axis about which the first end portion of the at least one tool support member is driven in a circular path.

6. The cultivating machine of claim 1, wherein the swing arm is connected with the structure for pivotal motion about an axis having a fixed position with respect to the structure.

7. The cultivating machine of claim 6, wherein the pivotal connection between the swing arm and the structure, and the pivotal connection between the swing arm and the link arm define axes which extend parallel to each other and to an axis about which the first end portion of the at least one tool support member is driven in a circular path.

8. The cultivating machine of claim 1, wherein the pivotal connection between the swing arm and the structure, and the pivotal connection between the swing arm and the link arm define axes which extend parallel to each other and to an axis about which the first end portion of the at least one tool support member is driven in a circular path.

9. A cultivating machine comprising a structure arranged to be mounted on ground engaging wheels for movement in a line of travel, at least one tool support member mounted on the structure so as to be moveable with respect thereto, and a drive mechanism operatively mounted between the structure and the at least one tool support member, the at least one tool support member comprising a body having first and second end portions, the first end portion being driven in use in a generally circular path by the drive mechanism and the second end portion being connected to the structure through a link arm pivotably attached to the at least one tool support member and to a swing arm, which in turn is attached to the structure for pivotal motion about an axis having a fixed position with respect to the structure, the swing arm being bi-directionally biased toward a median position by a biasing mechanism comprising resilient buffer material which is in contact with a stop member when the swing arm is in the median position and compressible by the stop member by movement of the swing arm from the median position whereby the buffer material applies a biasing force to urge the swing arm to the median position, the second end of the at least one tool support member carrying at least one cultivating tool.

10. The cultivating machine of claim 9, wherein a plurality of tool support members and biasing mechanisms are provided, and the tool support members are each bi-directionally biased toward a median position by a respective biasing mechanism.

11. The cultivating machine of claim 10, wherein the pivotal connection between the swing arm and the structure, and the pivotal connection between the swing arm and the link arm define axes which extend parallel to each other and to an axis about which the first end portion of the at least one tool support member is driven in a circular path.

12. The cultivating machine of claim 9, wherein the pivotal connection between the swing arm and the structure, and the pivotal connection between the swing arm and the link arm define axes which extend parallel to each other and to an axis about which the first end portion of the at least one tool support member is driven in a circular path.

13. A cultivating machine comprising a structure arranged to be mounted on ground engaging wheels for movement in a line of travel, at least one tool support means mounted on the structure so as to be moveable with respect thereto, and drive means mounted on the structure for driving the at least one tool support means, the at least one tool support means comprising a body having first and second end portions, the first end portion being driven in use in a circular path by the drive means and the second end portion being connected to the structure through a link arm pivotably attached to the at least one tool support means and to a swing arm, which in turn is pivotably attached to the structure, the swing arm being bi-directionally biased toward a median position by biasing means, said biasing means being positioned in contact with a stop member when the swing arm is in the median position and compressible thereby by movement of the swing arm from the median position whereby the biasing means applies a biasing force to urge the swing arm to the median position, the second end portion of the at least one tool support means carrying at least one cultivating tool.

14. A cultivating machine, comprising:
a structure for mounting on at least one ground engaging wheel rotatable about a first axis;
swing arm means pivoted at one end portion on the structure for rotation about a second axis fixed with respect to the structure and parallel to the first axis, said swing arm means having an opposite end portion;
biasing means on the structure for resiliently urging the swing arm means bi-directionally toward a median position of the rotation of the swing arm means, said biasing means being positioned in contact with a stop member when the swing arm is in the median position and compressible thereby by movement of the swing arm from the median position whereby the biasing means applies a biasing force to urge the swing arm to the median position;
link arm means pivoted at the opposite end portion of the swing arm means for rotation relative thereto about a third axis parallel to the first and second axes, the link arm means having an opposite end portion;
a tool support member having one end portion for supporting a cultivating tool, the one end portion of the tool support member being pivoted on the link arm means at the opposite end portion of the link arm means for rotation relative thereto, the tool support member further having an opposite end portion; and
drive means on the structure for rotating the opposite end portion of the tool support member in a circular path about a fourth axis parallel to the first, second and third axes.

15. A cultivating machine comprising a structure arranged to be mounted on ground engaging wheels for movement in a line of travel, at least one tool support member mounted on the structure so as to be moveable with respect thereto, a drive mechanism operatively mounted between the structure and the at least one tool support member, the at least one tool support member comprising a body having first and second end portions, the first end portion being driven in use in a generally circular path by the drive mechanism and the second end portion being connected to the structure through a link arm pivotably attached to the at least one tool support member and to a swing arm, which in turn is pivotably attached to the structure, the swing arm being bi-directionally biased toward a median position by a biasing mechanism comprising resilient buffer members which are in contact with a stop member carried on said structure when the swing arm is in the median position and compressible by the stop member by movement of the swing arm from the median position whereby the buffer members apply a biasing force to urge the swing arm to the median position, the second end portion of the at least one tool support member carrying at least one cultivating tool.

16. A cultivating machine comprising a structure arranged to be mounted on ground engaging wheels for movement in a line of travel, at least one tool support member mounted on the structure so as to be moveable with respect thereto, and a drive mechanism operatively mounted between the structure and the at least one tool support member, the at least one tool support member comprising a body having first and second end portions, the first end portion being driven in use in a generally circular path by the drive mechanism and the second end portion being connected to the structure through a link arm pivotably attached to the at least one tool support member and to a swing arm, which in turn is attached to the structure for pivotal motion about an axis having a fixed position, with respect to the structure, the swing arm being bi-directionally biased toward a median position by a biasing mechanism comprising resilient buffer material which is in contact with a stop member carried on said structure when the swing arm is in the median position and compressible by the stop member by movement of the swing arm from the median position whereby the buffer material applies a biasing force to urge the swing arms to the median position, the second end of the at least one tool support member carrying at least one cultivating tool.

17. A cultivating machine comprising a structure arranged to be mounted on ground engaging wheels for movement in a line of travel, at least one tool support means mounted on the structure so as to be moveable with respect thereto, and drive means mounted on the structure for driving the at least one tool support means, the at least one tool support means comprising a body having first and second end portions, the first end portion being driven in use in a circular path by the drive means and the second end portion being connected to the structure through a link arm pivotably attached to the at least one tool support means and to a swing arm, which in turn is pivotably attached to the structure, the swing arm being bi-directionally biased toward a median position by biasing means, said biasing means being positioned in contact with a stop member carried on said structure when the swing arm is in the median position and compressible thereby by movement of the swing arm from the median position whereby the biasing means applies a biasing force to urge the swing arm to the median position, the second end portion of the at least one tool support means carrying at least one cultivating tool.

18. A cultivating machine, comprising:
a structure for mounting on at least one ground engaging wheel rotatable about a first axis;
swing arm means pivoted at one end portion on the structure for rotation about a second axis fixed with respect to the structure and parallel to the first axis, said swing arm means having an opposite end portion;
biasing means on the structure for resiliently urging the swing arm means bi-directionally toward a median position of the rotation of the swing arm means, said biasing means being positioned in contact with a stop member carried on said structure when the swing arm is in the median position and compressible thereby by movement of the swing arm from the median position whereby the biasing means applies a biasing force to urge the swing arm to the median position;
link arm means pivoted at the opposite end portion of the swing arm means for rotation relative thereto about a third axis parallel to the first and second axes, the link arm means having an opposite end portion;
a tool support member having one end portion for supporting a cultivating tool, the one end portion of the tool support member being pivoted on the link arm means at the opposite end portion of the link arm means for rotation relative thereto, the tool support member further having an opposite end portion; and
drive means on the structure for rotating the opposite end portion of the tool support member in a circular path about a fourth axis parallel to the first, second and third axes.

19. The cultivating machine of claim 1 wherein the biasing means comprise resilient buffer members which are respectively compressed between a stop means and mounting means by opposite movements of the pivotable attachment of the swing arm to the structure.

20. The cultivating machine of claim 2 wherein the stop means projects from the swing arm adjacent an axis of the pivotable attachment of the swing arm to the structure, and the buffer members are mounted on the structure so as to abut the stop means.

21. The cultivating machine of claim 3 wherein the buffer members and stop means are positioned substantially above the axis.

22. The cultivating machine of claim 2 wherein the stop means is mounted on the structure and the buffer members are mounted on the swing arm adjacent to an axis of the pivotable attachment of the swing arm to the structure so as to abut the stop means.

23. The cultivating machine of claim 1 and further comprising a second tool support means, each tool support means respectively comprising post members, each of the post members having the first end portion being driven by the drive means so as to be between about 170° and 190° out of phase in their respective circular paths.

24. The cultivating machine of claim 1 wherein the circular path in which the first end portion is driven is in an opposite direction to rotation of the ground engaging wheels during the travel.

25. The cultivating machine of claim 2 wherein the resilient buffer members comprise substantially cylindrical, resilient bodies respectively mounted on opposite sides of one of the stop means and mounting means so that a portion of a circumference of each of the bodies abuts the other of the stop means and mounting means.

26. The cultivating machine of claim 2 wherein one of the resilient buffer members is harder than the other.

27. The cultivating machine of claim 7, wherein the post members are 180° out of phase.

28. The cultivating machine of claim 12, wherein a plurality of tool support members and biasing means are provided, and the tool support members are each bi-directionally biased toward a median position by a respective biasing means.

29. The cultivating machine of claim 1, wherein a plurality of tool support means and biasing means are provided, and each tool support means is bi-directionally biased toward a median position by a respective biasing means.

30. The cultivating machine of claim 1, wherein the swing arm is attached to the structure for pivotal motion about an axis that is fixed with respect to the structure.

31. The cultivating machine of claim 15, wherein the fixed axis of the swing arm is generally parallel with an axis of rotation of the drive means.

32. The cultivating machine of claim 14, wherein the swing arm is attached to the structure for pivotal motion about an axis that is fixed with respect to the structure.

33. The cultivating machine of claim 17, wherein the fixed axis of the swing arm is generally parallel with an axis of rotation of the drive means.

34. The cultivating machine of claim 18, wherein the circular path in which the first end portion is driven is in an opposite direction to rotation of the ground engaging wheels during the travel.

* * * * *